United States Patent
Minamida (10) Patent No.: US 11,444,323 B2
(45) Date of Patent: Sep. 13, 2022

(54) ALL-SOLID-STATE BATTERY

(71) Applicant: TOYOTA JIDOSHA KABUSHIKI KAISHA, Toyota (JP)

(72) Inventor: Yoshitaka Minamida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 16/782,229

(22) Filed: Feb. 5, 2020

(65) Prior Publication Data

US 2020/0266488 A1  Aug. 20, 2020

(30) Foreign Application Priority Data

Feb. 18, 2019  (JP) .............................. JP2019-026361

(51) Int. Cl.
*H01M 10/0565* (2010.01)
*H01M 10/0585* (2010.01)
*H01M 10/0562* (2010.01)

(52) U.S. Cl.
CPC ... *H01M 10/0565* (2013.01); *H01M 10/0562* (2013.01); *H01M 10/0585* (2013.01); *H01M 2300/0082* (2013.01)

(58) Field of Classification Search
CPC ............. H01M 10/565; H01M 10/585; H01M 10/0562; H01M 2300/0082
See application file for complete search history.

(56) References Cited

U.S. PATENT DOCUMENTS

| | | | |
|---|---|---|---|
| 2014/0308576 A1* | 10/2014 | Gaben | C25D 13/22 429/185 |
| 2017/0233533 A1 | 8/2017 | Harada et al. | |
| 2018/0342710 A1* | 11/2018 | Yoon | H01M 10/0463 |
| 2019/0157648 A1* | 5/2019 | Yeo | H01M 50/403 |
| 2019/0177455 A1* | 6/2019 | Harada | C08F 220/1802 |
| 2020/0067049 A1* | 2/2020 | Lee | H01M 4/13 |

FOREIGN PATENT DOCUMENTS

| JP | 2011100623 A | 5/2011 |
|---|---|---|
| JP | 6300926 B2 | 3/2018 |
| JP | 2018204004 A * | 12/2018 |

OTHER PUBLICATIONS

U.S. Appl. No. 16/524,431, based on JP Patent Application No. 2018-142443.

* cited by examiner

*Primary Examiner* — Matthew J Merkling
(74) *Attorney, Agent, or Firm* — Dickinson Wright PLLC (57) ABSTRACT

Provided is an all-solid-state battery configured to suppress the collapse of an end in the plane direction of an electrode laminate. Disclosed is an all-solid-state battery comprising an electrode laminate that comprises a cathode comprising a cathode layer, an anode comprising an anode layer, and a solid electrolyte layer disposed between the cathode layer and the anode layer, wherein a resin layer containing a polymer is disposed in at least a part of an end in a plane direction of the electrode laminate, the polymer having a self-healing function and a structure crosslinked via bonding between a host molecule and a guest molecule.

5 Claims, 3 Drawing Sheets

ALL-SOLID-STATE BATTERY

RELATED APPLICATION

This application claims priority to Japanese Patent Application No. 2019-026361, filed on Feb. 18, 2019, including the specification, drawings and abstract, the entire disclosure of which is incorporated herein by reference.

TECHNICAL FIELD

The disclosure relates to an all-solid-state battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses a laminated battery excellent in a peeling strength between a laminated body and resin, excellent in vibration resistance, and capable of saving a space.

Patent Literature 2 discloses a self-restoring macromolecular material and a method for producing the self-restoring macromolecular material.

Patent Literature 1: Japanese Patent Application Laid-Open No. 2011-100623

Patent Literature 2: Patent No. JP6300926

Once a crack is formed in an end in a plane direction of an electrode laminate by, for example, elongation of the end in a direction perpendicular to the laminating direction of the electrode laminate (hereinafter, the direction will be referred to as "plane direction"), which is due to compressive stress to the electrode laminate, or by elongation of the end in the plane direction of the electrode laminate, which is due to electrode expansion caused by charge and discharge of an all-solid-state battery comprising the electrode laminate, the end in the plane direction of the electrode laminate may collapse due to the crack.

SUMMARY

In light of the above circumstances, an object of the disclosed embodiments is to provide an all-solid-state battery configured to suppress the collapse of the end in the plane direction of the electrode laminate.

In a first embodiment, there is provided an all-solid-state battery comprising an electrode laminate that comprises a cathode comprising a cathode layer, an anode comprising an anode layer, and a solid electrolyte layer disposed between the cathode layer and the anode layer, wherein a resin layer containing a polymer is disposed in at least a part of an end in a plane direction of the electrode laminate, the polymer having a self-healing function and a structure crosslinked via bonding between a host molecule and a guest molecule, and wherein, before and after applying a predetermined confining pressure in a laminating direction to the electrode laminate, a first region covering at least a part of an end in a plane direction of the cathode of the resin layer and a second region covering at least a part of an end in a plane direction of the solid electrolyte layer of the resin layer, are attached to each other, and the second region and a third region covering at least a part of an end in a plane direction of the anode of the resin layer, are attached to each other.

A length of the resin layer in the plane direction of the electrode laminate may be larger than a maximum elongation length in the plane direction of one end in the plane direction of each of the cathode, the solid electrolyte layer and the anode, which is a length resulting from applying the predetermined confining pressure in the laminating direction to the electrode laminate.

When the host molecule is α-cyclodextrin, the guest molecule may be a molecule containing at least one selected from the group consisting of an n-butyl group, an n-hexyl group, an n-octyl group and an n-dodecyl group;

when the host molecule is β-cyclodextrin, the guest molecule may be a molecule containing at least one selected from the group consisting of an adamantyl group, a hydroxyl group-substituted adamantyl group, an ethyl group-substituted adamantyl group and an isobornyl group; and when the host molecule is γ-cyclodextrin, the guest molecule may be a molecule containing at least one selected from the group consisting of an n-octyl group, an n-dodecyl group and a cyclododecyl group.

According to the disclosed embodiments, the all-solid-state battery configured to suppress the collapse of the end in the plane direction of the electrode laminate, is provided.

BRIEF DESCRIPTION OF THE DRAWINGS

In the accompanying drawings.

DETAILED DESCRIPTION

The all-solid-state battery of the disclosed embodiments is an all-solid-state battery comprising an electrode laminate that comprises a cathode comprising a cathode layer, an anode comprising an anode layer, and a solid electrolyte layer disposed between the cathode layer and the anode layer, wherein a resin layer containing a polymer is disposed in at least a part of an end in a plane direction of the electrode laminate, the polymer having a self-healing function and a structure crosslinked via bonding between a host molecule and a guest molecule, and wherein, before and after applying a predetermined confining pressure in a laminating direction to the electrode laminate, a first region covering at least a part of an end in a plane direction of the cathode of the resin layer and a second region covering at least a part of an end in a plane direction of the solid electrolyte layer of the resin layer, are attached to each other, and the second region and a third region covering at least a part of an end in a plane direction of the anode of the resin layer, are attached to each other.

Once a crack is formed in the end in the plane direction of the electrode laminate by, for example, elongation of the end in the plane direction of the electrode laminate, which is due to compressive stress to the electrode laminate, or by elongation of the end in the plane direction of the electrode laminate, which is due to electrode expansion caused by charge and discharge of the all-solid-state battery, there is a possibility that the crack extends, and the collapse of the electrode laminate starts from the end in the plane direction of the electrode laminate.

By applying confining pressure in the laminating direction to the electrode laminate, the end in the plane direction of the cathode, the end in the plane direction of the solid electrolyte layer, and the end in the plane direction of the anode are elongated, depending on the mechanical properties of the cathode, the solid electrolyte layer and the anode. However, if the difference between the elongation length of the end in the plane direction of the cathode, the elongation length of the end in the plane direction of the solid electrolyte layer, and the elongation length of the end in the plane direction of the anode is large, there is a possibility that a crack may be formed in the end in the plane direction of the electrode laminate, the crack starting from the end in the plane direction of the cathode, the end in the plane direction of the solid electrolyte layer, and/or the end in the plane direction of the anode.

If an active material such as an alloy-based active material, which undergoes large volume change upon Li insertion and extraction, is used as an electrode material, the confining pressure to the all-solid-state battery increases when the all-solid-state battery is expanded by charge and discharge. Accordingly, there is a possibility that in response to the change in the confining pressure, the end in the plane direction of the cathode, the end in the plane direction of the solid electrolyte layer, and the end in the plane direction of the anode are elongated in the plan direction, and a crack is formed in the cathode, the solid electrolyte layer and/or the anode.

As long as the all-solid-state battery is produced as designed and, during charge and discharge of the all-solid-state battery, no crack is formed in the resin layer disposed at the end in the plane direction of the electrode laminate, no problem occurs in the all-solid-state battery during the battery is in use. However, once a crack is formed in the resin layer by, for example, a sudden increase in the confining pressure to the all-solid-state battery, which is due to an external factor, or by a variation in electrode volume change, which is due to multiple times of charge and discharge of the all-solid-state battery, there is a possibility that the crack extends to the end in the plane direction of the electrode laminate, and the collapse of the electrode laminate starts from the end in the plane direction of the electrode laminate.

If the collapse of the end in the plane direction of the electrode laminate occurs, there is a possibility that the battery characteristics of the all-solid-state battery are affected when a part of any of the cathode, the solid electrolyte layer and the anode, which are power generation elements, is lost.

In general, once a chemically-crosslinked polymer causes separation, the resulting separated polymer blocks cannot be attached if the polymer blocks are not heated to a temperature that is equal to or higher than the melting temperature of the polymer. Accordingly, once a crack is formed in the polymer, the cracked portion of the polymer cannot be healed at normal temperature, and the crack extends with passage of time.

However, it is difficult to detect the presence of a crack in the all-solid-state battery and automatically heat the all-solid-state battery, after the all-solid-state battery is encapsulated in an outer casing.

When the all-solid-state battery is heated at a temperature equal to or higher than the melting temperature of the polymer to attach the separated polymer blocks, it is difficult to melt the polymer only in the part where the crack is formed. If the whole polymer is melted and flows, the resin layer containing the polymer falls off the all-solid-state battery. Accordingly, it is difficult for the resin layer disposed at the end in the plane direction of the electrode laminate to keep covering the end well.

It was found that by covering the end in the plane direction of the electrode laminate, which is a component of the all-solid-state battery, with the polymer having the so-called self-healing function, which is a function to attach the separated polymer blocks at normal temperature, even if unintended sudden force is applied to the all-solid-state battery to form a crack in the resin layer, the separated polymer blocks are attached at normal temperature by the self-healing function of the polymer, whereby the end in the plane direction of the electrode laminate is prevented from collapsing.

According to the disclosed embodiments, by covering the end in the plane direction of the electrode laminate with the resin layer containing the polymer having the self-healing function, even if a crack is suddenly formed in the resin layer by the elongation of the end in the plane direction of the electrode laminate, which is due to the compressive stress to the electrode laminate, the crack formed in the resin layer is healed by the self-healing function resulting from host-guest interaction of the polymer contained in the resin layer, and the end in the plane direction of the electrode laminate is kept protected.

In the case of a conventional all-solid-state battery in which a silicon material, a carbonaceous material or the like, the material having high expansion and contraction rate, is used as the anode active material and in which the end in the plane direction of the electrode laminate is covered with a resin that is composed of a polymer not having a self-healing function, there is a possibility that a crack is formed in the resin layer by the elongation of the end in the plane direction of the electrode laminate, which is due to electrode expansion caused by charge and discharge of the all-solid-state battery including the electrode laminate, the end in the plane direction of the electrode laminate may collapse due to the crack.

However, according to the disclosed embodiments, by covering the end in the plane direction of the electrode laminate with the resin layer containing the polymer having the self-healing function, even if a crack is formed in the resin layer by the elongation of the end in the plane direction of the electrode laminate, which is due to electrode expansion caused by charge and discharge of the all-solid-state battery including the electrode laminate, the crack formed in the resin layer is healed by the self-healing function resulting from host-guest interaction of the polymer contained in the resin layer, and the end in the plane direction of the electrode laminate is kept protected.

Figure 1:
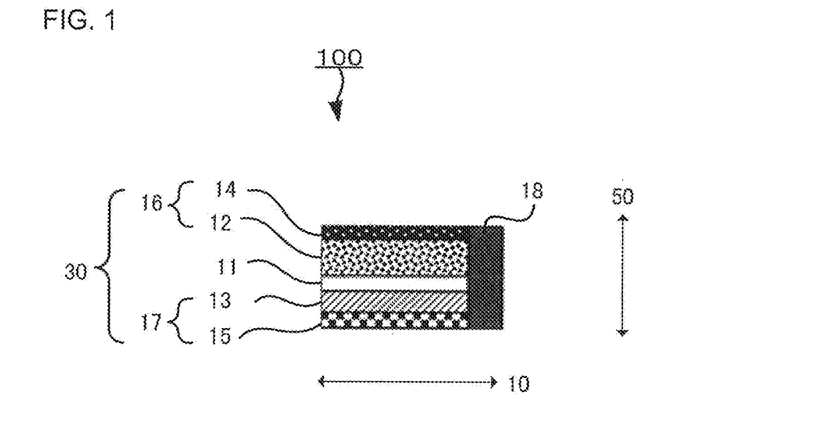
FIG. 1 is a schematic sectional view of an example of the all-solid-state battery of the disclosed embodiments.

FIG. 1 is a schematic sectional view of an example of the all-solid-state battery of the disclosed embodiments. In the accompanying drawings, for ease of illustration and understanding, components shown in the figures are appropriately scaled, or the horizontal to vertical dimensional ratio of the components is changed from the actual ratio and enlarged.

As shown in FIG. 1, an all-solid-state battery 100 comprises an electrode laminate 30 and a resin layer 18. The electrode laminate 30 comprises a cathode 16 comprising a cathode layer 12 and a cathode current collector 14, an anode 17 comprising an anode layer 13 and an anode current collector 15, and a solid electrolyte layer 11 disposed between the cathode 16 and the anode 17. The resin layer 18 is disposed in the right end in a plane direction 10 of the electrode laminate 30. In FIG. 1, "10" and "50" indicate the plane direction and laminating direction of the all-solid-state battery 100, respectively.

Figure 2:
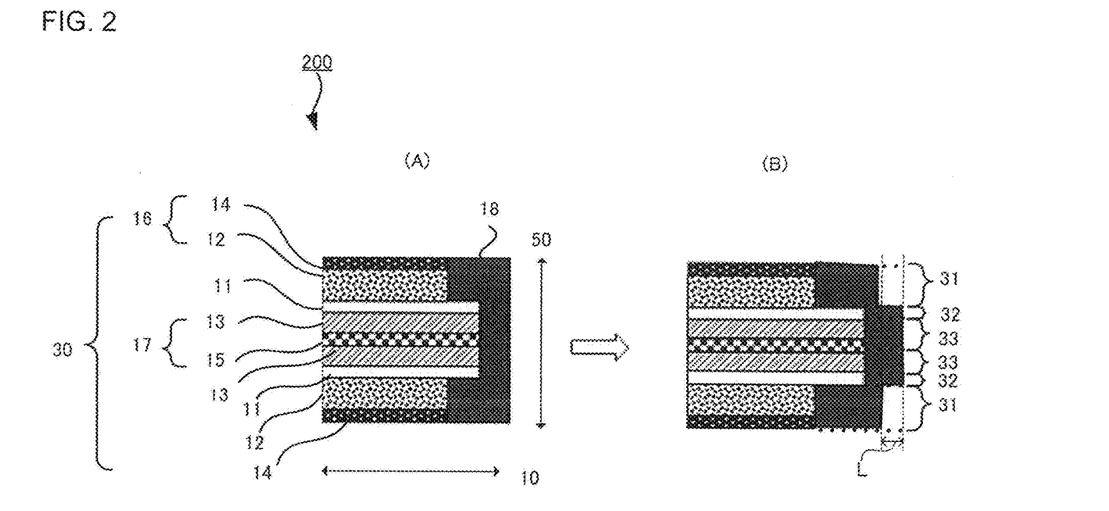
FIG. 2 shows schematic sectional views of another example of the all-solid-state battery of the disclosed embodiments.

FIG. 2 shows schematic sectional views of another example of the all-solid-state battery of the disclosed embodiments. In FIG. 2, "(A)" is a view showing the state of the end in the plane direction of the electrode laminate, before the end is elongated by applying the confining pressure to the electrode laminate of the all-solid-state battery, and "(B)" is a view showing the state of the end in the plane direction of the electrode laminate, after the end is elongated by applying the confining pressure to the electrode laminate of the all-solid-state battery. For the all-solid-state battery shown in FIG. 2, the resin layer is disposed only in the right end. In the disclosed embodiments, however, the resin layer may be also disposed in the left end. Of the reference signs shown in FIG. 2, the same signs as those shown in FIG. 1 will not be described here. The same applies to the below-described FIGS. 3 to 6.

As shown in FIG. 2, an all-solid-state battery 200 comprises the electrode laminate 30 and the resin layer 18. The electrode laminate 30 comprises the cathode current collector 14, the cathode layer 12, the solid electrolyte layer 11, the anode layer 13, the anode current collector 15, the anode layer 13, the solid electrolyte layer 11, the cathode layer 12, and the cathode current collector 14 in this order. The resin layer 18 is disposed in the right end in the plane direction 10 of the electrode laminate 30. As shown in "(A)" of FIG. 2, before the end is elongated, the width in the plane direction 10 of the solid electrolyte layer 11 and the width in the plane direction 10 of the anode 17 are larger than the width in the plane direction 10 of the cathode 16.

As shown in "(B)" of FIG. 2, after the end is elongated, in the all-solid-state battery 200 of the disclosed embodiments, even if the end in the plane direction 10 of the solid electrolyte layer 11 of the electrode laminate 30 and the end in the plane direction 10 of the anode 17 of the electrode laminate 30 are elongated by an elongation length L, the resin layer 18 follows the elongation of the ends. Also, a first region 31 covering the right end in the plane direction 10 of the cathode 16 of the resin layer 18 and a second region 32 covering the right end in the plane direction 10 of the solid electrolyte layer 11 of the resin layer 18, are attached to each other, and the second region 32 and a third region 33 covering the right end in the plane direction 10 of the anode 17 of the resin layer 18, are attached to each other.

Accordingly, even if a crack is formed in the resin layer 18 by the elongation of the ends, the crack is healed by the self-healing function of the resin layer 18. As a result, the collapse of the end in the plane direction 10 of the electrode laminate 30 is suppressed.

In the all-solid-state battery of the disclosed embodiments, therefore, even if a part or all of the cathode, a part or all of the solid electrolyte layer, and a part or all of the anode are elongated in the plane direction to various expansion degrees by, for example, applying the confining pressure to the electrode laminate or by an increase in the confining pressure of the all-solid-state battery caused by charge and discharge of the all-solid-state battery, as long as the fragments of the resin contained in the resin layer are attached to each other, a crack formed in the resin layer is healed by the self-healing function of the resin, and the end in the plane direction of the electrode laminate is kept protected.

Figure 3:
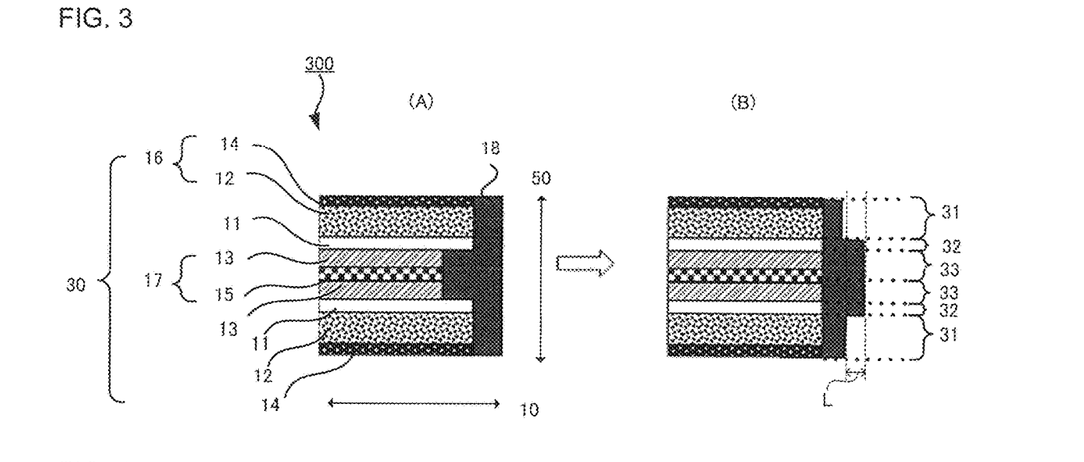
FIG. 3 shows schematic sectional views of another example of the all-solid-state battery of the disclosed embodiments.

FIG. 3 shows schematic sectional views of another example of the all-solid-state battery of the disclosed embodiments.

As shown in "(A)" of FIG. 3, before the end in the plane direction of the electrode laminate is elongated by applying the confining pressure to the electrode laminate, the width in the plane direction 10 of the anode 17 is smaller than the width in the plane direction 10 of the solid electrolyte layer 11 and the width in the plane direction 10 of the cathode 16.

As shown in "(B)" of FIG. 3, after the end in the plane direction of the electrode laminate is elongated by applying the confining pressure to the electrode laminate, in an all-solid-state battery 300 of the disclosed embodiments, even if the end in the plane direction 10 of the anode 17 of the electrode laminate 30 is elongated by the elongation length L, the resin layer 18 follows the elongation of the end. Also, the first region 31 covering the right end in the plane direction 10 of the cathode 16 of the resin layer 18 and the second region 32 covering the right end in the plane direction 10 of the solid electrolyte layer 11 of the resin layer 18, are attached to each other, and the second region 32 and the third region 33 covering the right end in the plane direction 10 of the anode 17 of the resin layer 18, are attached to each other.

Accordingly, even if a crack is formed in the resin layer 18 by the elongation of the ends, the crack is healed by the self-healing function of the resin layer 18. As a result, the collapse of the end in the plane direction 10 of the electrode laminate is suppressed.

Figure 4:
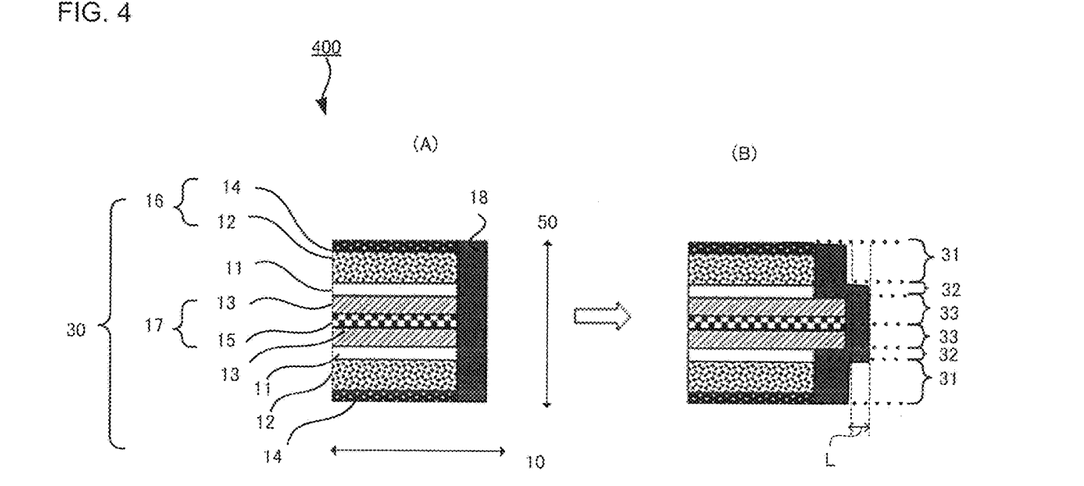
FIG. 4 shows schematic sectional views of another example of the all-solid-state battery of the disclosed embodiments.

FIG. 4 shows schematic sectional views of another example of the all-solid-state battery of the disclosed embodiments.

As shown in "(A)" of FIG. 4, before the end in the plane direction of the electrode laminate is elongated by applying the confining pressure to the electrode laminate, the width in the plane direction 10 of the solid electrolyte layer 11, the width in the plane direction 10 of the anode 17 and the width in the plane direction 10 of the cathode 16 are the same width.

As shown in "(B)" of FIG. 4, after the end in the plane direction of the electrode laminate is elongated by applying the confining pressure to the electrode laminate, in an all-solid-state battery 400 of the disclosed embodiments, even if the end in the plane direction 10 of the anode 17 of the electrode laminate 30 is elongated by the elongation length L, the resin layer 18 follows the elongation of the end. Also, the first region 31 covering the right end in the plane direction 10 of the cathode 16 of the resin layer 18 and the second region 32 covering the right end in the plane direction 10 of the solid electrolyte layer 11 of the resin layer 18, are attached to each other, and the second region 32 and the third region 33 covering the right end in the plane direction 10 of the anode 17 of the resin layer 18, are attached to each other.

Accordingly, even if a crack is formed in the resin layer 18 by the elongation of the ends, the crack is healed by the self-healing function of the resin layer 18. As a result, the collapse of the end in the plane direction 10 of the electrode laminate 30 is suppressed.

Figure 5:
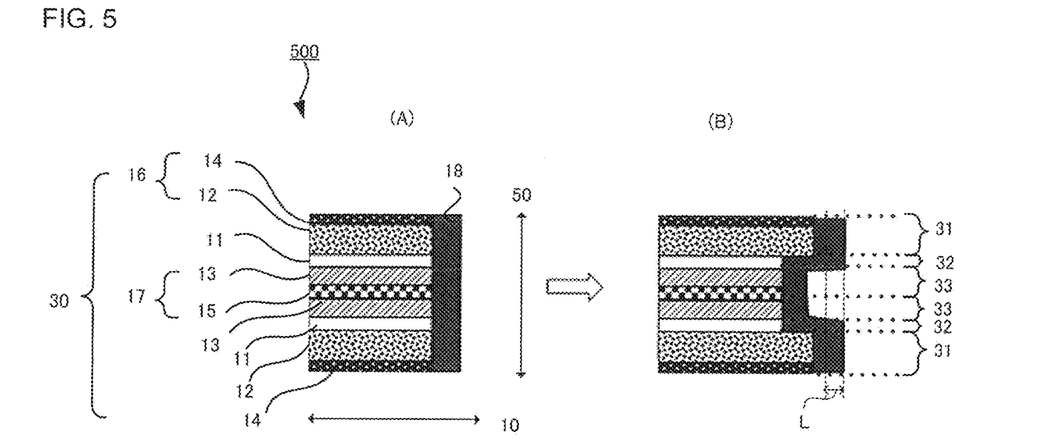
FIG. 5 shows schematic sectional views of another example of the all-solid-state battery of the disclosed embodiments.

FIG. 5 shows schematic sectional views of another example of the all-solid-state battery of the disclosed embodiments.

As shown in "(A)" of FIG. 5, before the end in the plane direction of the electrode laminate is elongated by applying the confining pressure to the electrode laminate, the width in the plane direction 10 of the solid electrolyte layer 11, the width in the plane direction 10 of the anode 17 and the width in the plane direction 10 of the cathode 16 are the same width.

As shown in "(B)" of FIG. 5, after the end in the plane direction of the electrode laminate is elongated by applying the confining pressure to the electrode laminate, in an all-solid-state battery 500 of the disclosed embodiments, even if the end in the plane direction 10 of the cathode 16 of the electrode laminate 30 is elongated by the elongation length L, the resin layer 18 follows the elongation of the end. Also, the first region 31 covering the right end in the plane direction 10 of the cathode 16 of the resin layer 18 and the second region 32 covering the right end in the plane direction 10 of the solid electrolyte layer 11 of the resin layer 18, are attached to each other, and the second region 32 and the third region 33 covering the right end in the plane direction 10 of the anode 17 of the resin layer 18, are attached to each other.

Accordingly, even if a crack is formed in the resin layer 18 by the elongation of the ends, the crack is healed by the self-healing function of the resin layer 18. As a result, the collapse of the end in the plane direction 10 of the electrode laminate 30 is suppressed.

Figure 6:
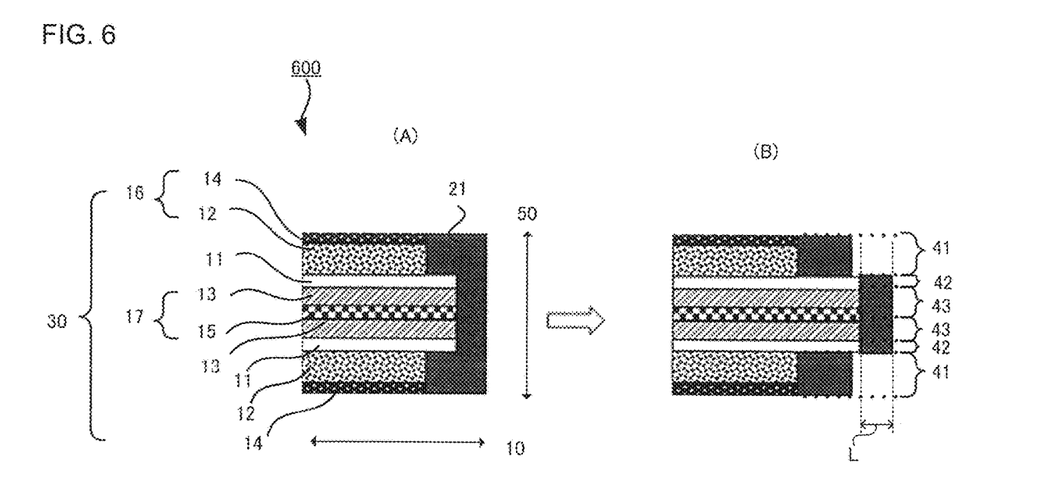
FIG. 6 shows schematic sectional views of an example of a conventional all-solid-state battery.

FIG. 6 shows schematic sectional views of an example of a conventional all-solid-state battery.

A conventional resin 21 not having a self-healing function is used in an all-solid-state battery 600 shown in FIG. 6, in place of the resin layer 18.

As shown in "(A)" of FIG. 6, before the end in the plane direction of the electrode laminate is elongated by applying the confining pressure to the electrode laminate, the width in the plane direction 10 of the solid electrolyte layer 11 and the width in the plane direction 10 of the anode 17 are larger than the width in the plane direction 10 of the cathode 16.

As shown in "(B)" of FIG. 6, when the end in the plane direction 10 of the solid electrolyte layer 11 of the electrode laminate 30 and the end in the plane direction 10 of the anode 17 of the electrode laminate 30 are elongated by the elongation length L by applying the confining pressure to the electrode laminate 30, in the conventional all-solid-state battery 600, the conventional resin 21 cannot follow the elongation of the ends. As a result, a fourth region 41 covering the right end in the plane direction 10 of the cathode 16 of the conventional resin 21 and a fifth region 42 covering the right end in the plane direction 10 of the solid electrolyte layer 11 of the conventional resin 21, are separated, and the fifth region 42 and a sixth region 43 covering the right end in the plane direction 10 of the anode 17 of the conventional resin 21, are separated.

Accordingly, when a crack is formed in the conventional resin 21 by the elongation of the ends, the conventional resin 21 cannot heal the crack since it does not have a self-healing function.

[Resin Layer]

The resin layer contains a polymer having a self-healing function and a structure crosslinked by host-guest interaction via bonding between a host molecule and a guest molecule.

The resin layer may be disposed in at least a part of the end in the plane direction of the electrode laminate. Before and after applying the predetermined confining pressure in the laminating direction to the electrode laminate, the first region covering at least a part of the end in the plane direction of the cathode of the resin layer and the second region covering at least a part of the end in the plane direction of the solid electrolyte layer of the resin layer, may be attached to each other, and the second region and the third region covering at least a part of the end in the plane direction of the anode of the resin layer, may be attached to each other. As long as the first region and the second region are attached to the second region and the third region, respectively, the polymer contained in the resin layer exerts the self-healing function, protects the end in the plane direction of the cathode, the end in the plane direction of the solid electrolyte layer, and the end in the plane direction of the anode, and suppresses the collapse of the end of the electrode laminate.

The confining pressure is not particularly limited, and it may be appropriately determined depending on the size and intended applications of the all-solid-state battery. The confining pressure may be from 1 MPa to 600 MPa.

The resin layer may be disposed in at least a part of the end in the plane direction of the electrode laminate. From the viewpoint of further suppressing the collapse of the end of the electrode laminate, the resin layer may be disposed on the whole end. The resin layer may cover at least a part of the end in the plane direction of the cathode, the end in the plane direction of the solid electrolyte layer, and the end in the plane direction of the anode. From the viewpoint of further suppressing the collapse of the end of the electrode laminate, the resin layer may cover all of the end in the plane direction of the cathode, the end in the plane direction of the solid electrolyte layer, and the end in the plane direction of the anode.

The end in the plane direction of the electrode laminate, in which the resin layer is disposed, may be only one end in the plane direction of the electrode laminate, or it may be both ends in the plane direction of the electrode laminate.

For example, when the all-solid-state battery is in a coin form, the resin layer may cover the whole side surface of the all-solid-state battery, which includes a gap between the cathode and the solid electrolyte layer and/or a gap between the solid electrolyte layer and the anode, the gaps being formed by the elongation of at least one of the following: the end in the plane direction of the cathode, the end in the plane direction of the solid electrolyte layer, and the end in the plane direction of the anode.

When the all-solid-state battery is in a rectangle form, the resin layer may cover at least one of the four side surfaces of the all-solid-state battery, which includes the gap between the cathode and the solid electrolyte layer and/or the gap between the solid electrolyte layer and the anode, the gaps being formed by the elongation of at least one of the following: the end in the plane direction of the cathode, the end in the plane direction of the solid electrolyte layer, and the end in the plane direction of the anode.

Also, when the all-solid-state battery is in a rectangle form, the resin layer may cover all of the four side surfaces of the all-solid-state battery, each of which includes the gap between the cathode and the solid electrolyte layer and/or the gap between the solid electrolyte layer and the anode, the gaps being formed by the elongation of at least one of the following: the end in the plane direction of the cathode, the end in the plane direction of the solid electrolyte layer, and the end in the plane direction of the anode.

The resin layer may contain a material other than the polymer, to the extent that does not inhibit the self-healing function. As the material, examples include, but are not limited to, a colorant, an antioxidant, a thermal stabilizer, a light stabilizer, an ultraviolet absorber, a lubricant, an antistatic agent, a flame retardant, a curing accelerator and a preservative.

The method for forming the resin layer is not particularly limited. For example, the resin layer may be formed as follows. First, by a capillary underfill method, an injection molding method, a transfer molding method, a dipping molding method or the like, a liquid material for the resin layer is supplied to the side surface which includes the gap between the cathode and the solid electrolyte layer and/or the gap between the solid electrolyte layer and the anode, the gaps being formed by the elongation of at least one of the following: the end in the plane direction of the cathode, the end in the plane direction of the solid electrolyte layer, and the end in the plane direction of the anode. The supplied resin is cured, thereby forming the resin layer in the end in the plane direction of the electrode laminate.

The liquid material is not needed to be a material that is liquid at normal temperature. It may be a resin melted by heating. The resin curing condition may be appropriately determined depending on the type of the resin used.

The length of the resin layer in the plane direction of the electrode laminate may be, for example, larger than the maximum elongation length in the plane direction of one end in the plane direction of each of the cathode, the solid electrolyte layer and the anode, which is a length resulting from applying the predetermined confining pressure in the laminating direction to the electrode laminate.

By satisfying the above length condition, the attachment between the first region and second region of the resin layer and the attachment between the second region and third region of the resin layer are easily maintained, and the self-healing function of the resin layer is easily exerted.

The maximum elongation length in the plane direction of one end in the plane direction of each of the cathode, the solid electrolyte layer and the anode, may be obtained as follows. The state of the electrode laminate before and after applying the predetermined confining pressure in the laminating direction to the electrode laminate, are observed, and the maximum elongation length is calculated from the difference between the length in the plane direction of one end in the plane direction of each of the cathode, the solid electrolyte layer and the anode after applying the confining pressure and the length in the plane direction of one end in the plane direction of each of the cathode, the solid electrolyte layer and the anode before applying the confining pressure.

The term "end" is used herein to calculate the maximum elongation length and means one end in the plane direction, and it does not mean both ends in the plane direction.

The confining pressure is not particularly limited, and it may be determined depending on the size and intended applications of the all-solid-state battery.

The polymer crosslinked by host-guest interaction means the polymer in which the main chain of the polymer includes a host molecule and a guest molecule as a side chain, and the host molecule and the guest molecule are crosslinked via bonding with other host and guest molecules.

Accordingly, the polymer can be formed into a three-dimensional network structure, using host-guest interaction as a crosslinking point.

The host-guest interaction can be caused by the following, for example: hydrophobic interaction between host and guest molecules, hydrogen bonding between host and guest molecules, intermolecular forces between host and guest molecules, electrostatic interaction between host and guest molecules, coordination bonding between host and guest molecules, and π-electron interaction between host and guest molecules.

The host molecule may be, for example, at least one selected from the group consisting of α-cyclodextrin, β-cyclodextrin, γ-cyclodextrin, calix[6]arenesulfonic acid, calix[8]arenesulfonic acid, 12-crown-4, 18-crown-6, [6]paracyclophane, [2,2]paracyclophane, cucurbit[6]uril and cucurbit[8]uril. The host molecule may further contain a substituent group, As the substituent group, examples include, but are not limited to, a halogen atom (e.g., fluorine, chlorine, bromine), a carboxyl group, an ester group, an amide group and a hydroxyl group that may be protected.

The host molecule may be at least one molecule selected from the group consisting of α-cyclodextrin, β-cyclodextrin and γ-cyclodextrin, or it may be a molecule derived from any of these derivatives.

As the guest molecule, examples include, but are not limited to, a straight- or branched-chain hydrocarbon group having 1 to 30 carbon atoms, a cycloalkyl group, an aryl group, a heteroaryl group and an organometallic complex. They may contain at least one substituent group each.

As the guest molecule, examples also include, but are not limited to, a chain or cyclic alkyl group having 4 to 18 carbon atoms. The cyclic alkyl group may have a cage-form structure. As the at least one substituent group, examples include, but are not limited to, a halogen atom, a carboxyl group, an ester group, an amide group and a hydroxyl group that may be protected.

The guest molecule may be at least one molecule selected from the group consisting of an alcohol derivative, an aryl compound, a carboxylic acid derivative, an amino derivative, an azobenzene derivative having a cyclic alkyl group or a phenyl group, a cinnamic acid derivative, an aromatic compound, an alcohol derivative of an aromatic compound, an amine derivative, a ferrocene derivative, azobenzene, a naphthalene derivative, an anthracene derivative, a pyrene derivative, a perylene derivative, clusters composed of carbon atoms such as fullerene, and a dansyl compound, for example.

The guest molecule may be a molecule containing at least one selected from the group consisting of an n-butyl group, an n-dodecyl group, a t-butyl group and an adamantyl group.

The combination of the host molecule and the guest molecule may be as follows.

When the host molecule is α-cyclodextrin, the guest molecule may be a molecule containing at least one selected from the group consisting of an n-butyl group, an n-hexyl group, an n-octyl group and an n-dodecyl group.

When the host molecule is β-cyclodextrin, the guest molecule may be a molecule containing at least one selected from the group consisting of an adamantyl group, a hydroxyl group-substituted adamantyl group, an ethyl group-substituted adamantyl group and an isobornyl group.

When the host molecule is γ-cyclodextrin, the guest molecule may be a molecule containing at least one selected from the group consisting of an n-octyl group, an n-dodecyl group and a cyclododecyl group.

When the combination of the host molecule and the guest molecule is any one of the above, stable host-guest interaction easily occurs. Especially, the self-healing performance of the polymer is easily exerted.

For the polymer crosslinked by the host-guest interaction, the polymer type is not particularly limited, as long as the polymer contains host and guest molecules that can cause host-guest interaction.

For example, the polymer crosslinked by the host-guest interaction, can be formed from a polymer chain including a host molecule and a guest molecule in a side chain thereof.

The polymer crosslinked by the host-guest interaction may be a polymer having a constitutional unit derived from a monomer represented by the below-described general formula (1) or (2).

As the polymer, examples include, but are not limited to, a polymer chain in which the main chain is a (meth)acrylamide framework or a (meth)acrylic ester framework and which includes a host molecule and a guest molecule in a side chain.

When the main chain of the polymer chain includes a (meth)acrylamide framework, the host molecule and the guest molecule can directly or indirectly bind to the nitrogen atom of the amide group.

When the main chain of the polymer chain is a (meth)acrylic ester framework, the host molecule and the guest molecule can directly or indirectly bind to the oxygen atom of the ester group.

In the disclosed embodiments, "(meth)acrylic" means "acrylic or methacrylic". That is, for example, the term "(meth)acrylic acid" is used for the same meaning as "acrylic acid or methacrylic acid".

The polymer chain including the host molecule and the guest molecule in the side chain, may include a constitutional unit which does not contain a host molecule and a guest molecule (hereinafter, it may be referred to as "third constitutional unit"). In the case of containing the third constitutional unit, the chance of steric hindrance or the like is more reduced during the host-guest interaction, and the host-guest interaction easily occurs.

The polymer chain may include various kinds of substituent groups in the main or side chain, to the extent that does not inhibit the host-guest interaction. Also, the polymer chain may include a substituent group that functions to accelerate the host-guest interaction.

As the third constitutional unit, examples include, but are not limited to, a (meth)acrylamide, a (meth)acrylamide derivative, and a derivative derived from a (meth)acrylic acid or a (meth)acrylic acid ester.

As the (meth)acrylamide derivative, examples include, but are not limited to, N,N-dimethylacrylamide and N,N-dimethylaminopropylacrylamide. As the (meth)acrylic acid ester, examples include, but are not limited to, methyl (meth)acrylate, ethyl (meth)acrylate, propyl (meth)acrylate, 2-hydroxyethyl (meth)acrylate and 2-hydroxypropyl (meth)acrylate.

Especially when the third constitutional unit is a constitutional unit derived from a (meth)acrylamide, the effects of the polymer crosslinked by the host-guest interaction are easily exerted, and the polymer easily obtains excellent self-healing properties.

When the third constitutional unit is a constitutional unit derived from a (meth)acrylamide or a (meth)acrylic acid ester, the polymer easily obtains high adhesive force. In this case, the (meth)acrylic acid ester may be 2-hydroxyethyl (meth)acrylate, for example. For a copolymer of a (meth)acrylamide and a (meth)acrylic acid ester, the molar ratio of the (meth)acrylamide to the (meth)acrylic acid ester may be from 1:99 to 99:1, may be from 20:80 to 80:20, or may be from 40:60 to 60:40.

From the viewpoint of the ease of host-guest interaction, the polymer chain including the host molecule and the guest molecule in the side chain may be such that a plurality of host and guest molecules are included in one polymer chain.

For example, the polymer chain including the host molecule and the guest molecule in the side chain may be such that constitutional units each including a host molecule in a side chain and constitutional units each including a guest molecule in a side chain are randomly arranged, or they may be arranged in a block form or may be regularly (e.g., alternately) arranged. From the viewpoint of the ease of host-guest interaction and the ease of production, constitutional units each including a host molecule in a side chain and constitutional units each including a guest molecule in a side chain are randomly arranged.

For the polymer chain including the host molecule and the guest molecule in the side chain, the constitutional units may be as follows: the constitutional unit including the host molecule is from 1 mol % to 20 mol % and the constitutional unit including the guest molecule is from 1 mol % to 20 mol %; the constitutional unit including the host molecule is from 1 mol % to 5 mol % and the constitutional unit including the guest molecule is from 1 mol % to 5 mol %; or the constitutional unit including the host molecule is from 2 mol % to 4 mol % and the constitutional unit including the guest molecule is from 2 mol % to 4 mol %. The rest (i.e., at least one constitutional unit) may be the third constitutional units, for example.

As the polymer crosslinked by the host-guest interaction, examples also include, but are not limited to, a crosslinked polymer formed by host-guest interaction between a polymer chain including a host molecule and not including a guest molecule and a polymer chain including a guest molecule and not including a host molecule.

To produce the polymer, for example, a polymerizable monomer that contains a host molecule-containing polymerizable monomer and a guest molecule-containing polymerizable monomer, may be used. From the viewpoint of the ease of polymerization, the host molecule-containing polymerizable monomer and the guest molecule-containing polymerizable monomer may be radically polymerizable monomers.

As the host molecule-containing polymerizable monomer, examples include, but are not limited to, a polymerizable monomer represented by the following general formula (1):

where Ra is a hydrogen atom or a methyl group; $R^1$ is a divalent group formed by removing one hydrogen atom from a monovalent group selected from the group consisting of a hydroxyl group, a thiol group, an alkoxy group optionally having one or more substituent groups, a thioalkoxy group optionally having one or more substituent groups, an alkyl group optionally having one or more substituent groups, an amino group optionally having one or more substituent groups, an amide group optionally having one or more substituent groups, an aldehyde group and a carboxyl group; and RA is a host molecule. The type of the host molecule is the same as described above.

The host molecule-containing polymerizable monomer may be a (meth)acrylic acid ester derivative or a (meth)acrylamide derivative, for example. As the host molecule-containing polymerizable monomer, examples include, but are not limited to, 6-(meth)acrylamide-α-cyclodextrin, 6-(meth)acrylamide-β-cyclodextrin, α-cyclodextrin(meth)acrylate, β-cyclodextrin(meth)acrylate, α-cyclodextrin(meth)acrylate, β-cyclodextrin(meth)acrylate and styrene. The host molecule-containing polymerizable monomer may be produced by a known method.

As the guest molecule-containing polymerizable monomer, examples include, but are not limited to, a polymerizable monomer represented by the following general formula (2):

where Ra is a hydrogen atom or a methyl group; $R^2$ is a divalent group formed by removing one hydrogen atom from a monovalent group selected from the group consisting of a hydroxyl group, a thiol group, an alkoxy group optionally having one or more substituent groups, a thioalkoxy group optionally having one or more substituent groups, an alkyl group optionally having one or more substituent groups, an amino group optionally having one or more substituent groups, an amide group optionally having one or more substituent groups, an aldehyde group and a carboxyl group; and $R^3$ is a guest molecule. The type of the guest molecule is the same as described above.

The guest molecule-containing polymerizable monomer may be a (meth)acrylic acid ester derivative or a (meth)acrylamide derivative, for example. As the guest molecule-containing polymerizable monomer, examples include, but are not limited to, n-butyl (meth)acrylate, t-butyl (meth)acrylate, 1-acrylamide adamantane, N-(1-adamantyl)(meth)acrylamide, N-benzyl (meth)acrylamide and N-1-naphthylmethyl (meth)acrylamide. The guest molecule-containing polymerizable monomer may be produced by a known method.

The polymerizable monomer containing the host molecule-containing polymerizable monomer and the guest molecule-containing polymerizable monomer, may contain a polymerizable monomer other than the host molecule- and guest molecule-containing polymerizable monomers. The polymerizable monomer other than the host molecule- and guest molecule-containing polymerizable monomers may be a compound that is able to form the above-described "third constitutional unit", for example.

If the polymerizable monomer other than the host molecule- and guest molecule-containing polymerizable monomers is a mixture of a (meth)acrylamide and a (meth)acrylic acid ester, the resulting polymer easily obtains high adhesive force. In this case, the (meth)acrylic acid ester may be 2-hydroxyethyl (meth)acrylate, for example. For the copolymer of the (meth)acrylamide and the (meth)acrylic acid ester, the molar ratio of the constitutional units, that is, the molar ratio of the (meth)acrylamide to the (meth)acrylic acid ester may be from 1:99 to 99:1, may be from 20:80 to 80:20, or may be from 40:60 to 60:40. When the polymerizable monomer other than the host molecule- and guest molecule-containing polymerizable monomers is a (meth)acrylamide polymer, the resulting polymer easily obtains self-healing properties.

A crosslinking agent may be contained in the polymerizable monomer.

The content of the host molecule-containing polymerizable monomer and the guest molecule-containing polymerizable monomer in the polymerizable monomer, is not particularly limited. For example, from the viewpoint of the ease of host-guest interaction, the content of the host molecule-containing polymerizable monomer and the guest molecule-containing polymerizable monomer may be as follows: with respect to the total amount of the polymerizable monomer (including the crosslinking agent), the host molecule-containing polymerizable monomer is from 1 mol % to 20 mol % and the guest molecule-containing polymerizable monomer is from 1 mol % to 20 mol %; the host molecule-containing polymerizable monomer is from 1 mol % to 5 mol % and the guest molecule-containing polymerizable monomer is from 1 mol % to 5 mol %; or the host molecule-containing polymerizable monomer is from 2 mol % to 4 mol % and the guest molecule-containing polymerizable monomer is from 2 mol % to 4 mol %.

The method for polymerizing the polymerizable monomer is not particularly limited, and the polymerizable monomer may be polymerized by a known method. For example, the polymerization reaction of the polymerizable monomer may be accelerated by use of a known polymerization initiator.

When the polymerization reaction is radical polymerization, as the polymerization initiator, examples include, but are not limited to, a persulfate such as ammonium persulfate, sodium persulfate and potassium persulfate, an azo compound such as azobisisobutyronitrile, 2,2'-azobis[2-(2-imidazoline-2-yl)propane]dihydrochloride (product name: "VA-044") and 1,1'-azobis(cyclohexanecarbonitrile), an organic peroxide such as di-tert-butylperoxide, tert-butylhydroperoxide and benzoyl peroxide, and a photopolymerization initiator (e.g., IRGACURE (trademark) series).

The amount of the polymerization initiator used may be, for example, from 0.1 mol % to 5 mol %, with respect to the total amount of the polymerizable monomers.

To accelerate the polymerization reaction, a polymerization accelerator may be used. As the polymerization accelerator, examples include, but are not limited to, N,N,N',N'-tetramethylethylenediamine and [2-(dimethylamino)ethyl]dimethylamine.

The polymerization temperature varies depending on the type of the polymerizable monomer used or the half-life temperature of the polymerization initiator. For example, the polymerization temperature is from 0° C. to 100° C., or it may be from 20° C. to 25° C. The polymerization reaction time is from one hour to 24 hours, or it may be from 12 hours to 24 hours.

The polymerization reaction may be photopolymerization developed by ultraviolet irradiation, etc. The conditions for the photopolymerization, such as UV type and UV irradiation time, are not particularly limited. The photopolymerization may be developed in the same conditions as known photopolymerizations.

To develop the polymerization reaction of the polymerizable monomers, the polymerizable monomers may be dissolved or dispersed in a solvent. In this case, a known solvent may be used as the solvent, such as water, alcohol, DMF, DMSO, a ketone and an ester.

[Solid Electrolyte Layer]

The solid electrolyte layer contains at least a solid electrolyte.

When the total mass of the solid electrolyte layer is determined as 100 mass %, the content of the binder in the solid electrolyte layer may be 5 mass % or less, from the viewpoint of, for the purpose of easily achieving high all-solid-state battery power output, preventing excessive aggregation of the solid electrolyte particles, enabling the formation of the solid electrolyte layer in which the solid electrolyte particles are uniformly dispersed, etc.

As the solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be sulfide glass, crystallized sulfide glass (glass ceramics) or a crystalline material obtained by developing a solid state reaction of the raw material composition.

The crystal state of the sulfide-based solid electrolyte can be confirmed by X-ray powder diffraction measurement using CuKα radiation, for example.

The sulfide glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired sulfide glass can be efficiently obtained.

The glass ceramics can be obtained by heating the sulfide glass, for example.

For the heating, the heating temperature may be a temperature higher than the crystallization temperature (Tc) of the sulfide glass, which is a temperature observed by thermal analysis measurement. In general, it is 195° C. or more. On the other hand, the upper limit of the heating temperature is not particularly limited.

The crystallization temperature (Tc) of the sulfide glass can be measured by differential thermal analysis (DTA).

The heating time is not particularly limited, as long as desired crystallinity is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3-x}PO_{4-x}N_x$ (LiPON).

From the viewpoint of handling, the form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when particles are arranged in ascending order of their particle diameter, the accumulated volume of the particles is half (50%) the total volume of the particles (volume average diameter).

The content of the solid electrolyte in the solid electrolyte layer may be from 50 mass % to 100 mass %, for example, when the total mass of the solid electrolyte layer is determined as 100 mass %.

The binder contained in the solid electrolyte layer is not particularly limited. As the binder, examples include, but are not limited to, those exemplified below as the binder that may be used in the cathode layer.

The solid electrolyte layer may be formed by the following method, for example. First, a solid electrolyte layer slurry containing a solid electrolyte, a binder, a solvent and, as needed, other components is prepared; the slurry is applied on a support; and the applied slurry is dried, thereby obtaining the solid electrolyte layer.

The solvent used in the solid electrolyte layer slurry is not particularly limited. As the solvent, examples include, but are not limited to, those exemplified below as the solvent that may be used in a cathode layer slurry.

The method for applying the solid electrolyte layer slurry is not particularly limited. As the method, examples include, but are not limited to, those exemplified below as the method for applying the cathode layer slurry.

The support may be appropriately selected from self-supporting supports, and it is not particularly limited. For example, a metal foil of aluminum, nickel or the like may be used as the support. In the case of forming the solid electrolyte layer, the support may be the anode layer or the cathode layer.

[Cathode]

The cathode comprises at least the cathode layer. As needed, it comprises the cathode current collector.

The cathode layer contains a cathode active material. As optional components, the cathode layer may contain a solid electrolyte, an electroconductive material, a binder, etc.

The type of the cathode active material is not particularly limited. As the cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the cathode active material represented by the general formula $Li_xM_yO_z$, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$.

Cathode active materials other than the one represented by the general formula $Li_xM_yO_z$ include, for example, lithium titivates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. From the viewpoint of handling, it may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. For the thickness of the coating layer, the lower limit may be 0.1 nm or more, or it may be 1 nm or more, for example. On the other hand, the upper limit may be 100 nm or less, or it may be 20 nm or less, for example.

The content of the cathode active material in the cathode layer is not particularly limited. When the total mass of the cathode layer is determined as 100 mass %, the content of the cathode active material may be in a range of from 10 mass % to 100 mass %, for example.

As the solid electrolyte used in the cathode layer, examples include, but are not limited to, those exemplified above as the solid electrolyte used in the solid electrolyte layer.

The content of the solid electrolyte in the cathode layer is not particularly limited. When the total mass of the cathode layer is determined as 100 mass %, the content of the solid electrolyte may be in a range of from 1 mass % to 80 mass %, for example.

As the electroconductive material, a known electroconductive material may be used. As the electroconductive material, examples include, but are not limited to, a carbonaceous material and metal particles. The carbonaceous material may be at least one selected from the group consisting of carbon nanotube, carbon nanofiber and carbon blacks such as acetylene black (AB) and furnace black. Of them, from the viewpoint of electron conductivity, the electroconductive material may be at least one selected from the group consisting of carbon nanotube and carbon nanofiber. The carbon nanotube and carbon nanofiber may be vapor-grown carbon fiber (VGCF). As the metal particles, examples include, but are not limited to, particles of Ni, particles of Cu, particles of Fe and particles of SUS.

The content of the electroconductive material in the cathode layer is not particularly limited.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode layer is not particularly limited.

The thickness of the cathode layer is not particularly limited. For example, it may be from 10 μm to 250 μm, or it may be from 20 μm to 200 μm.

The cathode layer can be formed by a conventionally-known method.

For example, a cathode layer slurry is produced by putting the cathode active material and, as needed, other components in a solvent and mixing them. The cathode layer slurry is applied on one surface of a support such as the cathode current collector. The applied slurry is dried, thereby forming the cathode layer.

As the solvent, examples include, but are not limited to, butyl acetate, butyl butyrate, heptane and N-methyl-2-pyrrolidone.

The method for applying the cathode layer slurry on one surface of the support such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The cathode layer may be formed by another method such as pressure-forming a powdered cathode mix that contains the cathode active material and, as needed, other components.

The pressure applying method is not particularly limited. As the method, examples include, but are not limited to, pressing by use of a plate press machine, a roll press machine or the like.

As the cathode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Anode]

The anode comprises at least an anode layer. As needed, the anode comprises an anode current collector.

The anode layer contains an anode active material. As optional components, the anode layer may contain a solid electrolyte, an electroconductive material, a binder, etc.

As the anode active material, a conventionally-known material may be used. As the conventionally-known material, examples include, but are not limited to, elemental Li, a lithium alloy, carbon, elemental Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, alloys with metals such as Li. Also, the Si alloy may be an alloy with at least one kind of metal selected from the group consisting of Sn, Ge and Al.

The form of the anode active material is not particularly limited. For example, the anode active material may be in a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

As the electroconductive material, binder and solid electrolyte contained in the anode layer, examples include, but are not limited to, those exemplified above as the electro-conductive material, binder and solid electrolyte contained in the cathode layer.

The method for forming the anode layer is not particularly limited. As the method, examples include, but are not limited to, pressure-forming a powdered anode mix that contains the anode active material and, as needed, other components such as an electroconductive material and a binder.

As the pressure applying method, examples include, but are not limited to, those exemplified above as the method for pressure-forming the cathode layer.

Another example of the method for producing the anode layer is as follows: an anode layer slurry containing the anode active material, a solvent and, as needed, other components such as an electroconductive material and a binder, is prepared; the anode layer slurry is applied on one surface of a support such as the anode current collector or solid electrolyte layer; and the applied anode layer slurry is dried, thereby forming the anode layer. As the solvent used in the anode layer slurry, examples include, but are not limited to, those exemplified above as the solvent used in the cathode layer slurry. As the method for applying the anode layer slurry to one surface of the support such as the anode current collector or solid electrolyte layer, examples include, but are not limited to, those exemplified above as the method for applying the cathode layer slurry.

As the anode current collector, the same metal as the cathode current collector, may be used.

The form of the anode current collector is not particularly limited. It may be the same form as the above-described cathode current collector.

The form of the whole anode is not particularly limited. It may be a sheet form. In this case, the thickness of the whole anode is not particularly limited. It can be determined depending on desired performance.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, an all-solid-state lithium battery in which a lithium metal deposition-dissolution reaction is used as an anode reaction, an all-solid-state lithium ion battery in which lithium ions transfer between the cathode and the anode, an all-solid-state sodium battery, an all-solid-state magnesium battery and an all-solid-state calcium battery. The all-solid-state battery may be the all-solid-state lithium ion battery. Also, the all-solid-state battery may be a primary or secondary battery.

As the form of the all-solid-state battery, examples include, but are not limited to, a coin form, a laminate form, a cylindrical form and a square form.

An example of the method for forming the all-solid-state battery of the disclosed embodiments, is as follows. First, the solid electrolyte layer is formed by pressure-forming the powdered solid electrolyte material. The cathode layer slurry is applied on one surface of the cathode current collector. The applied cathode layer slurry is dried, thereby obtaining the cathode comprising the cathode layer. Then, the anode layer slurry is applied on one surface of the anode current collector. The applied anode layer slurry is dried, thereby obtaining the anode comprising the anode layer. The solid electrolyte layer is disposed between the cathode layer and the anode layer to ensure that the cathode current collector, the cathode layer, the solid electrolyte layer, the anode layer and the anode current collector are arranged in this order, thereby obtaining the electrode laminate. The resin layer is formed in the end in the plane direction of the electrode laminate, thereby obtaining the all-solid-state battery.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

REFERENCE SIGNS LIST

10. Plane direction
11. Solid electrolyte layer
12. Cathode layer
13. Anode layer
14. Cathode current collector
15. Anode current collector
16. Cathode
17. Anode
18. Resin layer
21. Conventional resin
30. Electrode laminate
31. First region
32. Second region
33. Third region
41. Fourth region
42. Fifth region
43. Sixth region
50. Laminating direction
100. All-solid-state battery
200. All-solid-state battery
300. All-solid-state battery
400. All-solid-state battery
500. All-solid-state battery
600. Conventional all-solid-state battery
L. Elongation length in the plane direction of one end

The invention claimed is:

1. An all-solid-state battery comprising an electrode laminate that comprises a cathode comprising a cathode layer, an anode comprising an anode layer, and a solid electrolyte layer disposed between the cathode layer and the anode layer,
   wherein a resin layer containing a polymer is disposed in at least a part of an end in a plane direction of the electrode laminate, the polymer having a self-healing function and a structure crosslinked via bonding between a host molecule and a guest molecule, and
   wherein, before and after applying a predetermined confining pressure in a laminating direction to the electrode laminate, a first region covering at least a part of an end in a plane direction of the cathode of the resin layer and a second region covering at least a part of an end in a plane direction of the solid electrolyte layer of the resin layer, are attached to each other, and the second region and a third region covering at least a part of an end in a plane direction of the anode of the resin layer, are attached to each other, wherein, the host molecule is at least one molecule selected from the group consisting of α-cyclodextrin, β-cyclodextrin, γ-cyclodextrin, and a molecule derived from any of these, and wherein, the guest molecule is a molecule containing at least one selected from the group consisting of an n-butyl group, an n-hexyl group, an n-octyl group, an n-dodecyl group, a cyclododecyl group, an adamantyl group, a hydroxyl group substituted adamantyl group, an ethyl group-substituted adamantyl group and an isobornyl group.

2. The all-solid-state battery according to claim 1, wherein a length of the resin layer in the plane direction of the electrode laminate is larger than a maximum elongation length in the plane direction of one end in the plane direction of each of the cathode, the solid electrolyte layer and the anode, which is a length resulting from applying the predetermined confining pressure in the laminating direction to the electrode laminate.

3. The all-solid-state battery according to claim 1, wherein, the host molecule is a-cyclodextrin, and wherein the guest molecule is a molecule containing at least one selected from the group consisting of an n-butyl group, an n-hexyl group, an n-octyl group and an n-dodecyl group.

4. The all-solid-state battery according to claim 1, the host molecule is β-cyclodextrin, and wherein, the guest molecule is a molecule containing at least one selected from the group consisting of an adamantly group, a hydroxyl group-substituted adamantyl group, an ethyl group-substituted adamantyl group and an isobornyl group.

5. The all-solid-state battery according to claim 1, wherein, the host molecule is γ-cyclodextrin, and wherein, the guest molecule is a molecule containing at least one selected from the group consisting of an n-octyl group, an n-dodecyl group and a cyclododecyl group.

* * * * *